UNITED STATES PATENT OFFICE.

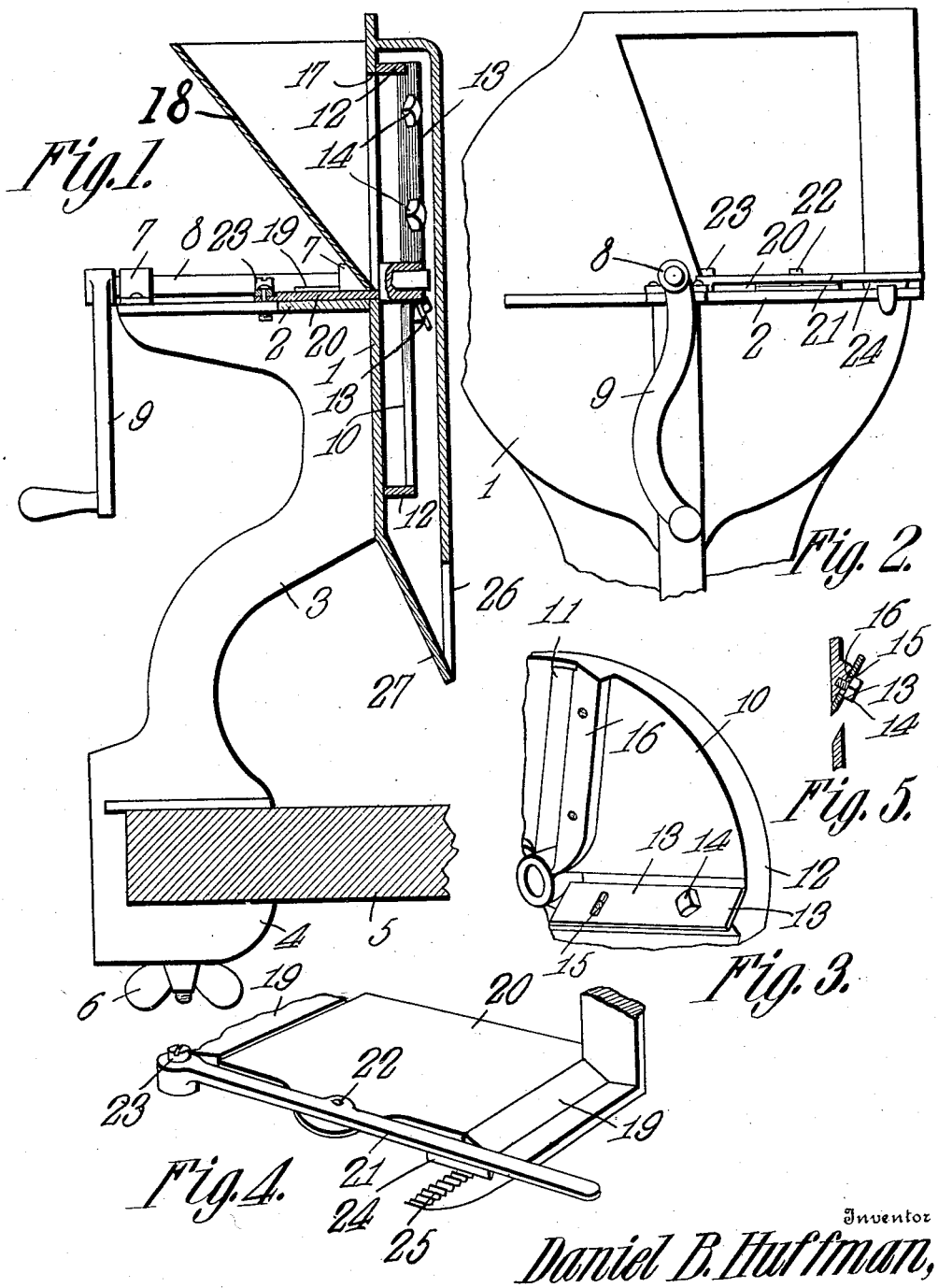

DANIEL B. HUFFMAN, OF WHITE, IDAHO.

VEGETABLE-CUTTER.

968,663.  Specification of Letters Patent.  Patented Aug. 30, 1910.

Application filed May 17, 1909. Serial No. 496,337.

*To all whom it may concern:*

Be it known that I, DANIEL B. HUFFMAN, a citizen of the United States, residing at White, in the county of Kootenai and State of Idaho, have invented a new and useful Vegetable-Cutter, of which the following is a specification.

This invention relates to vegetable cutters in which the vegetables are fed through a hopper against a revolving disk provided with slots, and knives adjacent to the slots.

The invention has for its object to provide an improved vegetable cutter of this kind by means of which the vegetables may be effectively fed against the disk and cut by the knives thereon.

The invention consists of a vegetable cutter and in details thereof, constructed and arranged as hereinafter set forth and claimed.

Referring to the drawing, Figure 1 is a side view in elevation and partly in vertical section of a vegetable cutter constructed according to this invention and in position for use. Fig. 2 is a rear view of the upper portion thereof with the feed hopper removed. Fig. 3 is a view in perspective of a portion of the rotary disk showing the position of the knives. Fig. 4 is a detail view in perspective of the adjustable slide gage. Fig. 5 is a detail view in cross section showing the beveled edge of one of the edges of a slot, and the inclined knife on the opposite edge of the slot.

In carrying out the invention the vegetable cutter is constructed with a cylindrical casing 1, having projecting laterally therefrom at its center a horizontal shelf 2, said shelf and casing being mounted on a bracket arm 3 having a fork shaped lower end 4 adapted to be clamped to the edge of a table 5 by a set screw 6.

Mounted in brackets 7 on the shelf 2, and extending across the same and through the casing 1, is a rotary shaft 8 provided on one end with an operating crank handle 9. Mounted on the other end of shaft 8 is a rotary disk 10 provided with radial slots 11, and an inturned peripheral flange 12, which is contiguous to the side of casing 1, adjacent to shelf 2. Knives 13 are adjustably mounted on the back of disk 10 by means of set screws 14 extending through slots 15 in the knives 13 and into the disk 10. Each knife 13 is located on one edge of each slot 11, and at an incline thereto on the raised portions 16. The opposite edge of each slot 11 is beveled to correspond with the incline of the portion 16 and the knife 13.

The side of casing 1, adjacent to shelf 2, and above the latter is provided with an opening 17 and detachably secured to the casing 1 in any suitable manner is a feed hopper 18 extending over the opening 17.

Mounted in guides 19 on the shelf 2 beneath the lower end of hopper 18 is a slidable gage plate 20 which is adjustable toward and away from the inner face of disk 10 by means of a lever 21 pivoted at 22 to the rear end of plate 20, and pivoted at 23 to the shelf 2. The lever 21 is held in adjusted position by an edged projection 24 thereon engaging ratchet teeth 25 on the shelf 2. By means of the plate 20 which is adapted to have its forward end adjustably located across the space between the front face of casing 1, and the disk 10, so as to narrow or widen the passageway for the cut pieces of vegetables dropping down in casing 1, the size and quantity of the substances cut at the bottom of the hopper, and dropping through the casing 1 may be regulated.

The bottom of the casing 1 is provided with an opening 26 beneath which is suspended a discharge hopper 27.

In lieu of the handle 9 the shaft 8 may be driven by any suitable gear mechanism operated by a handle or power.

Vegetables being fed through hopper 18 will be cut by the knives 13 on the rotating disk 10 and the cut pieces will pass through the slots 11 to the bottom of casing 1, and out through discharge hopper 27.

Having described the invention, I claim:—

The improved vegetable cutter herein described and shown comprising a supporting bracket, a horizontal shelf on the upper end of said bracket, a cylindrical casing on the front side of the bracket, a shaft journaled upon said shelf and projecting into the casing, a cutting disk secured on the end of the shaft within the casing, a hopper secured to the casing above the shaft, guides on the shelf at the sides of the same, a gage plate slidably mounted between the guides and adapted to extend into the casing and against the cutting disk, ratchet teeth on the upper side of the shelf beyond the end of one of the guides, and a lever fulcrumed at one end to the shelf adjacent the end of the other guide, the lever having a projection on its under side engaging the ratchet teeth on the shelf and being pivoted at a point between said projection and its fulcrum to the outer edge of the gage plate.

In testimony that I claim the foregoing as my own, I have hereto affixed my signature in the presence of two witnesses.

DANIEL B. HUFFMAN.

Witnesses:
　M. M. SAMMONS,
　J. C. GROVER.